Patented Aug. 9, 1938

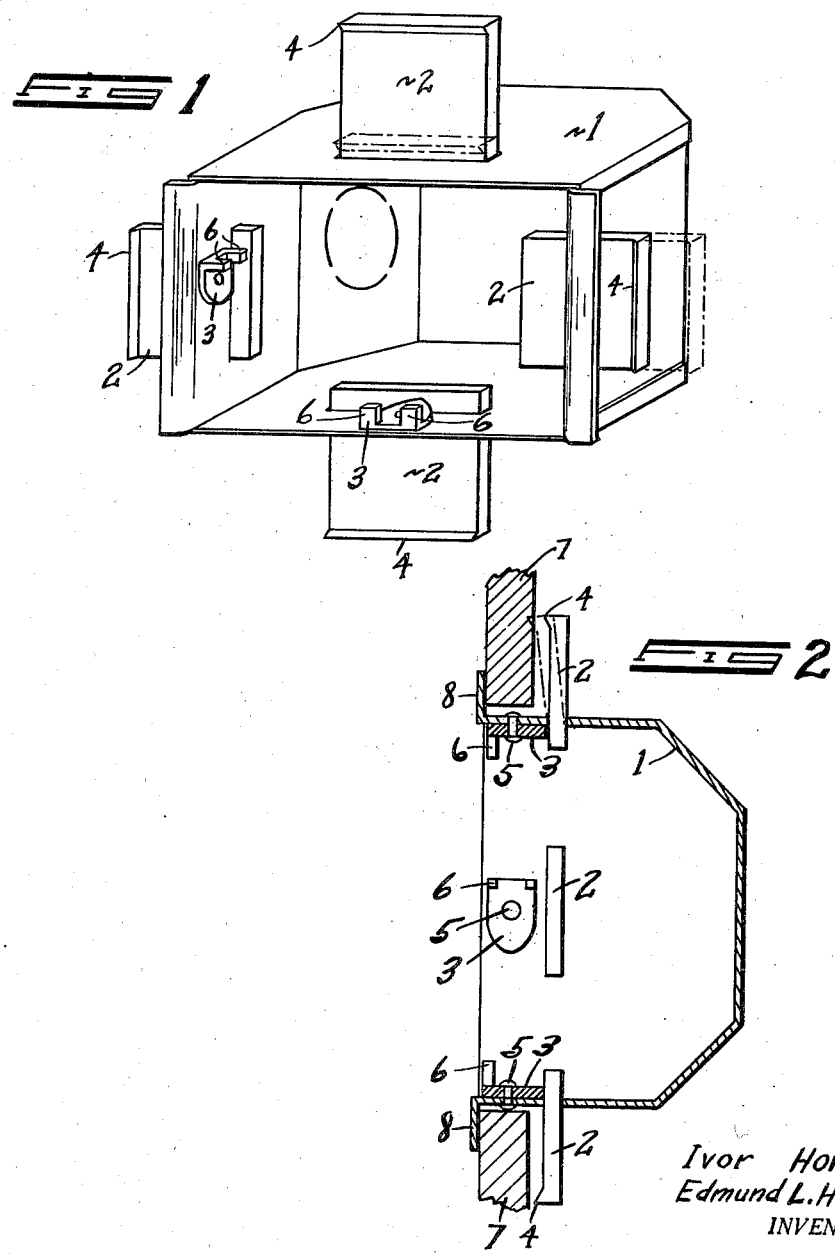

2,126,259

UNITED STATES PATENT OFFICE 2,126,259

OUTLET BOX

Ivor Howells, Girard, and Edmund L. Howells, Canton, Ohio

Application June 24, 1937, Serial No. 150,122

2 Claims. (Cl. 247—21)

This invention relates to outlet boxes.

The principal object of this invention is the provision of an outlet box designed to be positioned in an opening in a wall and to be clamped securely in that opening.

A further object of this invention is the provision of an outlet box having one or more clamping units positioned thereon, the said clamping units so formed that they may be readily operated with a screw driver or similar tool.

In installing electrical convenience outlets in walls that have been built prior to the time of the installation of the outlet, it becomes necessary to position an outlet box in an opening in the plaster board or lath and plaster sections of the wall so that the electrical convenience outlet itself may be installed in the outlet box. By designing an outlet box with clamping members positioned thereon, we have provided a simple means of installing an outlet box. We have provided a novel clamp adapted for use on the outlet box.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a perspective view of an outlet box with a plurality of clamping members positioned thereon.

Figure 2 is a side elevation, partly in cross section, of an outlet box positioned in an opening and showing the clamping means in position.

By referring to the drawing it will be seen that an outlet box 1 has been provided with a plurality of clamping members, each of which comprises a clamping arm 2 and an eccentric locking means 3. Each of the clamping arms 2 is formed of a section of metal and has a gripping edge 4 on the outer end thereof. These clamping arms 2 are slidably positioned in slots in the outlet box so that the clamping arms may be positioned within the box when the box is inserted in an opening, and then extended out of the box when clamped. The eccentric clamping means 3 comprises an eccentric pivoted to the outlet box by means of a pin 5, and each eccentric has a pair of upturned ends 6 spaced apart and adapted to receive a screw driver or similar tool, so that by giving the eccentric a quarter turn the clamping arm is locked into an extended position.

In Figure 2 the outlet box equipped with a plurality of clamping members is shown positioned in an opening in a wall, the wall board being represented by numeral 7. It will be seen that a pair of out-turned flanges 8 on the outlet box 1 positions the box properly in the opening, while the clamping arms 2 are shown in solid line extended and ready to be locked; and in dotted line, locked in position. The clamping arm 2, when locked in position, is caused to tilt inwardly and engage the wall board or plaster by means of the gripping edge 4. In Figure 2 the gripping edge is shown locked into the wall board.

It is obvious that one or a plurality of these clamps may be used on a single outlet box, as for instance, the slidable clamp may be used as a single clamping means for the box, with the simple provision of a solid U-shaped clamp opposite it on the outlet box.

What we claim is:—

1. The combination of an outlet box and a pair of clamping members, each of which comprises a slidable clamping arm and an eccentric locking member, said eccentric locking member adapted to engage and lock the said clamping arm once the arm has been moved into locking position in relation to the said outlet box, said eccentric formed with a pair of up-turned ends to provide means of operating the said eccentric, substantially as described.

2. In an outlet box comprising a rectangular metal box adapted to be inserted into an opening in a wall, a plurality of clamps on said outlet box, each of which comprises a slidable clamping arm, a gripping edge formed on said clamping arm, locking means positioned adjacent to the said clamping arms, the said locking means adapted to engage and lock the said clamping arm once the arm has been moved into locking position in relation to the said outlet box, said locking means comprising an eccentric pivoted to the said outlet box, a pair of upturned ends on said eccentric adapted to be engaged with a tool to rotate the eccentric, substantially as described.

IVOR HOWELLS.
EDMUND L. HOWELLS.